United States Patent
Kameyama et al.

(10) Patent No.: US 12,545,747 B2
(45) Date of Patent: *Feb. 10, 2026

(54) METHOD, KIT, AND DEVICE FOR PREPARING GLYCAN FROM GLYCOPROTEIN

(71) Applicants: National Institute of Advanced Industrial Science and Technology, Tokyo (JP); Sumitomo Bakelite Co., Ltd., Tokyo (JP)

(72) Inventors: Akihiko Kameyama, Tsukuba (JP); Masaaki Toyoda, Tokyo (JP); Midori Sakaguchi, Tokyo (JP)

(73) Assignees: National Institute of Advanced Industrial Science and Technology, Tokyo (JP); Sumitomo Bakelite Co., Ltd., Tokyo (JP)

( * ) Notice: Subject to any disclaimer, the term of this patent is extended or adjusted under 35 U.S.C. 154(b) by 652 days.

This patent is subject to a terminal disclaimer.

(21) Appl. No.: 17/413,212

(22) PCT Filed: Dec. 10, 2019

(86) PCT No.: PCT/JP2019/048323
§ 371 (c)(1),
(2) Date: Jun. 11, 2021

(87) PCT Pub. No.: WO2020/122072
PCT Pub. Date: Jun. 18, 2020

(65) Prior Publication Data
US 2022/0017648 A1  Jan. 20, 2022

(30) Foreign Application Priority Data
Dec. 13, 2018 (JP) ................. 2018-233837

(51) Int. Cl.
*C08B 37/00* (2006.01)
*G01N 33/53* (2006.01)

(52) U.S. Cl.
CPC ..... *C08B 37/0003* (2013.01); *G01N 33/5308* (2013.01)

(58) Field of Classification Search
None
See application file for complete search history.

(56) References Cited

U.S. PATENT DOCUMENTS 5,972,618 A * 10/1999 Bloch .................. C12Q 1/6827
536/23.1
2019/0309003 A1 10/2019 Kameyama et al.
2020/0216484 A1* 7/2020 Toyoda .................. B01J 20/327

FOREIGN PATENT DOCUMENTS

JP    2012201653 A   10/2012
WO   2018062167 A1   4/2018

OTHER PUBLICATIONS

Graham, Biochemica Biophysica Acta 74, 1963, 222-238. (Year: 1963).*
Ruhaak, Anal Bioanal Chem (2010) 397:3457-3481. (Year: 2010).*
Kameyama, PLoS ONE 13 (5): e0196800, published May 3, 2018. (Year: 2018).*
Search Report issued in European Application No. 19895629 on Jul. 28, 2022, 9 pages.
Chen et al., Interaction modes and approaches to glycopeptide and glycoprotein enrichment, Analyst, Royal Society of Chemistry, Nov. 22, 2013, pp. 688-704, 139.
Tajiri et al., Differential analysis of site-specific glycans on plasma and cellular fibronectins: application of a hydophilic affinity method for glycopeptide enrichment, Glycobiology, Jul. 21, 2005, pp. 1332-1340, vol. 15, No. 12.
Huang et al., Synthesis of zwitterionic polymer brushes hybrid silica nanoparticles via controlled polymerization for highly efficient enrichment of glycopeptides, Analytica Chimica Acta, Elsevier, Dec. 2013 (Dec. 1, 2013), pp. 61-68, vol. 809, 1, Amsterdam, NL.
Qu et al., Structural analysis of N- and O-glycans using ZIC-HILIC/dialysis coupled to NMR detection, Fungal Genetics and Biology, Aug. 10, 2014 (Aug. 10, 2014), pp. 207-215, vol. 72, San Diego, CA, US.
Thaysen-Andersen, Analysis of Protein Glycosylation using HILIC, Merck SeQuant Technical Summary TS-001, Jan. 2010 (Jan. 1, 2010), pp. 1-4, Sweden.

* cited by examiner

*Primary Examiner* — Layla D Berry
(74) *Attorney, Agent, or Firm* — The Webb Law Firm

(57) ABSTRACT

Provided are a method for preparing a glycan from a glycoprotein, and a kit and a device for preparing a glycan from a glycoprotein. The method includes (I) a step of obtaining a glycan-containing sample by bringing a glycan releasing solution that contains a hydroxylamine compound and a basic reagent into contact with the glycoprotein and releasing the glycan from the glycoprotein; (II) a step of adsorbing a glycan having a length of a monosaccharide or more on a purifying agent for purifying the glycan by bringing the glycan-containing sample into contact with the purifying agent, which is composed of a compound having a betaine structure; and (III) a step of eluting the glycan from the purifying agent.

10 Claims, 4 Drawing Sheets

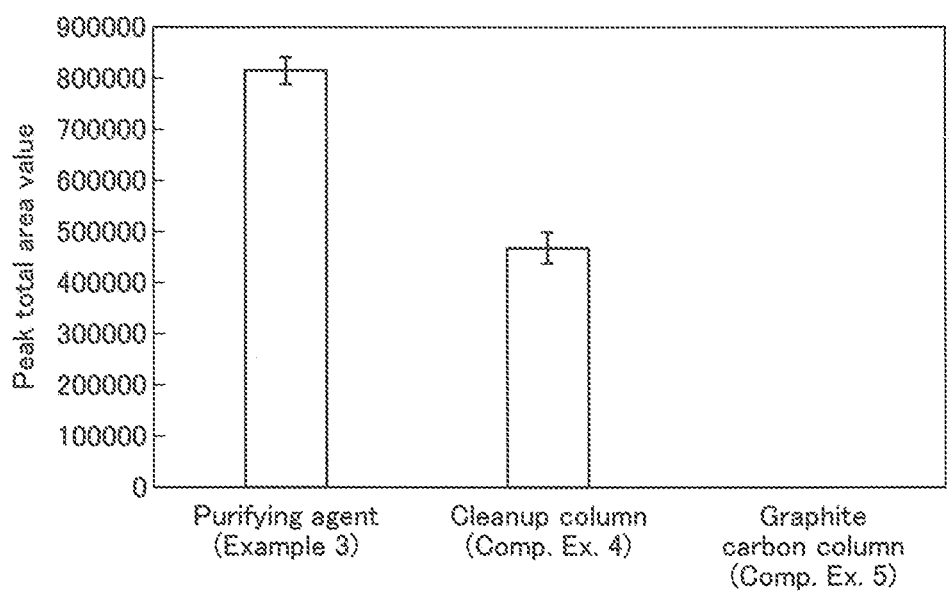

METHOD, KIT, AND DEVICE FOR PREPARING GLYCAN FROM GLYCOPROTEIN

CROSS-REFERENCE TO RELATED APPLICATIONS

This application is the United States national phase of International Application No. PCT/JP2019/048323 filed Dec. 10, 2019, and claims priority to Japanese Patent Application No. 2018-233837 filed Dec. 13, 2018, the disclosures of which are hereby incorporated by reference in their entirety.

TECHNICAL FIELD

The present invention relates to a method, a kit, and a device for preparing a glycan from a glycoprotein.

BACKGROUND ART

Most of the proteins constituting an organism are glycosylated, and are present as glycoproteins to which glycans are linked. With regard to proteins, higher-order structure formation, functions such as cell-cell signal transduction and molecular recognition, and in vivo kinetics are regulated through this glycosylation. It is known that the structure and distribution of glycans in a glycoprotein are associated with the functional expression of the protein, and the glycan structure changes along with the development and progression of many diseases, and it is possible to use glycans of glycoproteins as biomarkers for diseases. Also, it has been suggested that glycans affect not only the activity of biopharmaceuticals but also the antigenicity and kinetics thereof.

Therefore, it is expected that glycoprotein structural analysis plays an important role in various technical fields such as life science, medical care, and drug discovery, to elucidate mechanisms of the development of various diseases associated with structural changes in glycans, to develop disease treatment and diagnostic techniques, and the like, and the importance of structural analysis of glycans is increasing.

Therefore, there is demand for constructing techniques for analyzing the structures of glycans quickly, easily, and highly accurately. Glycans are usually analyzed through high-performance liquid chromatography (HPLC), nuclear magnetic resonance spectroscopy, capillary electrophoresis (CE method), or mass spectrometry, or a combination thereof. However, in order to analyze glycans using the above-described method, it is necessary to release the glycans from a glycoprotein, and to purify (collect) only the resulting free glycans.

Glycoproteins are classified into an N-linked glycan and an O-linked glycan according to the binding form of glycans to proteins. Conventionally, methods that are suitable for the corresponding types of glycans have been used to release glycans from glycoproteins.

In order to release N-linked glycans, enzymes such as PNGase F and glycopeptidase A can be used, for example. However, if an enzyme is used to release glycans, proteins are treated with a reducing reagent such as dithiothreitol in advance, are denatured through treatment using an alkylating agent such as iodoacetamide, and are decomposed into peptides using protease such as trypsin, and then glycans are released through a reaction with a glycan-releasing enzyme. Therefore, it takes a long time to release the glycans because pretreatment needs to be performed. Furthermore, PNGase F and glycopeptidase A are very expensive and thus it is considerably costly to analyze many specimens.

Also, a method for releasing glycans through a chemical reaction such as hydrazinolysis may be used without using enzymes. Hydrazinolysis is mainly used as a method for releasing N-linked glycans, in which a sufficiently dried glycoprotein is dissolved in anhydrous hydrazine, and is treated through heating at 100° C. for 10 hours or more, for example. After the reaction, anhydrous hydrazine needs to be distilled off under vacuum pressure, and acetylation needs to be performed using sodium hydrogen carbonate and acetic anhydride. This is because hydrazine also decomposes and converts an N-acetyl group and an N-glycolyl group linked to glycans to amino groups, and thus acetylation is performed to return them to the original groups. However, hydrazinolysis needs to be performed under completely anhydrous conditions, and if even a small amount of water is mixed in a reaction system, the yield will significantly decrease. Therefore, the reaction needs to be performed after a sample is sufficiently dried under vacuum pressure in advance. Furthermore, the reaction time is 10 hours or longer, and, if hydrazine is distilled off after the reaction and re-acetylation is performed, it takes at least two days or more to complete all the processes. Also, hydrazine is carcinogenic toxin and an explosive compound, and thus needs to be handled with extreme care. Furthermore, if other acyl groups such as an N-glycolyl group are originally bound thereto, all of them are acetylated and also analyzed as N-acetyl form, and thus there is also a problem in that N-glycolylneuraminic acid cannot be analyzed. In particular, the presence or absence of N-glycolylneuraminic acid, which is one type of sialic acid, may be problematic in biopharmaceuticals and glycan disease markers.

Because no practical enzyme for releasing O-linked glycans has been found, O-linked glycans are mostly released through chemical reaction. A method in which glycans are subjected to β-elimination in an aqueous solution of a strong alkali is widely used as a chemical reaction for releasing O-linked glycans. However, the free glycans are immediately decomposed in the presence of alkali, and thus, a method in which the free glycans are immediately reduced to alditol through a rection in the coexistence of sodium borohydride is usually used.

The free alditol is an alcohol obtained by reducing an aldehyde group on the glycan side, which serves as a functional group on which a fluorescent label is to be provided, and thus no fluorescent label can be provided. Therefore, usually, all the hydroxy groups of alditol are methylated (complete methylation), and then mass spectrometry is performed thereon.

The above-described hydrazinolysis is known as another method for chemically releasing O-linked glycans while preserving the aldehyde group. After the reaction, hydrazine is distilled off, re-acetylation is performed, a fluorescent label is provided, and then analysis is performed through HPLC or the like.

On the other hand, in both cases where an O-linked glycan is released through hydrazinolysis and an O-linked glycan is released through alkali β-elimination, a side reaction (peeling reaction) always occurs in which a sugar linked to the 3-position of N-acetylgalactosamine at the reducing end of a glycan is eliminated. There has been a problem that, even if β-elimination is performed using a weak base in order to suppress this reaction, not only peeling is unavoidable but also release efficiency is significantly reduced. Furthermore, the reaction time is 16 hours or longer.

Also, with a method in which sodium borohydride is used together to suppress peeling, a labeling reagent cannot be provided to the reducing end, and thus it is not possible to perform highly sensitive analysis through HPLC or the like.

The inventors of the present invention have constructed a method for releasing glycans from glycoproteins using a basic catalyst in an aqueous solution in the presence of hydroxylamine as a method for releasing N-linked glycans and O-linked glycans from proteins using a safe and inexpensive chemicals in a short treatment time without using a special system (Patent Document 1).

Also, conventionally, glycans released from glycoproteins have been purified using a method in which hydrophilic interaction is utilized, a method in which covalent bond formation is utilized using phenylboronic acid, a method in which interaction with lectins is utilized, a method in which chelate interaction with titanium (e.g., titanium oxide ($TiO_2$)), zirconium, silver, or the like is utilized, or the like, for example (e.g., see Non-Patent Document 1 etc.).

Here, the physicochemical properties of glycans are utilized in the method in which hydrophilic interaction is utilized, and glycans are selectively adsorbed and collected using Sepharose beads, utilizing hydrogen bonding formed between hydroxy groups of Sepharose and glycans (e.g., see Non-Patent Documents 1 and 2 etc.). However, the interaction between Sepharose and glycans is weak, and thus, O-linked glycans with a small molecular weight are influenced by impurities such as proteins and peptide fragments contained in a sample, and as a result, the O-linked glycans will be weakly carried by Sepharose beads. Therefore, there is a problem that the efficiency of concentrating glycans and the reproducibility thereof are reduced.

PRIOR ART DOCUMENTS

Patent Documents

Patent Document 1: WO 2008/062167

Non-Patent Documents

Non-Patent Document 1: Chen-Chun Chen et al., "Interaction modes and approaches to glycopeptide and glycoprotein enrichment", Analyst, 2014, vol. 139, p. 688-704

Non-Patent Document 2: Michiko Tajiri et al., "Differential analysis of site-specific glycans on plasma and cellular fibronectins: Application of a hydrophilic affinity method for glycopeptide enrichment", Glycobiology, 2005, vol. 15, no. 12, p. 1332-1340

DISCLOSURE OF THE INVENTION

Problem to be Solved by the Invention

In view of this, the present invention provides a glycan preparation technique by which a glycan can be prepared from a glycoprotein in a short period of time through a simple operation while the decomposition of the glycan is suppressed. In particular, an object thereof is to provide a glycan preparation technique by which glycans including O-linked glycans with a small molecular weight can be collected in a high yield.

Means for Solving Problem

As a result of conducting intensive studies in order to solve the above-described problems, the inventors of the present invention found that it is possible to collect glycans including O-linked glycans with a small molecular weight in a high yield by bringing a glycan releasing solution containing a hydroxylamine compound and a basic reagent into contact with a glycoprotein, releasing glycans from the glycoprotein, and bringing the resulting mixture into contact with a purifying agent made of a compound having a betaine structure. Also, the inventors found that this reaction can be carried out in a short period of time with a simple operation, and it is also possible to suppress decomposition (peeling) of glycans.

That is, the present invention provides a method, a kit, and a device for preparing a glycan from a glycoprotein, and specifically, includes the following configurations.

(1) A method for preparing a glycan from a glycoprotein includes:
(I) a step of obtaining a glycan-containing sample that contains a glycan by bringing a glycan releasing solution that contains a hydroxylamine compound and a basic reagent into contact with the glycoprotein and releasing the glycan from the glycoprotein;
(II) a step of adsorbing a glycan having a length of a monosaccharide or more on a purifying agent for purifying the glycan by bringing the glycan-containing sample into contact with the purifying agent, which is composed of a compound having a betaine structure; and
(III) a step of eluting the glycan from the purifying agent.

(2) The method according to (1) above further includes (IV) a glycan labeling step of reacting a glycan labeling reagent in a glycan labeling solution and the glycan with each other.

(3) The method according to (2) above further includes (V) a reduction step of causing a reaction with a reduction solution that contains a reducing reagent.

(4) In the method according to (3) above, a concentration of the reducing reagent in the reduction solution is 1.0 mmol/L or more and 250 mmol/L or less.

(5) In the method according to (1) to (4) above, the glycan releasing solution contains hydroxylamines in an amount of 2% or more and 70% or less.

(6) In the method according to (1) to (5) above, the hydroxylamine compound is at least one selected from the group consisting of hydroxylamine, salts of hydroxylamine, O-substituted hydroxylamine, and salts of O-substituted hydroxylamine.

(7) In the method according to (1) to (6) above, the basic reagent is at least one selected from the group consisting of alkali metal hydroxides, weak acid salts of alkali metals, alkaline earth metal hydroxides, alkaline earth metal salts dissolved in aqueous ammonia, and organic bases.

(8) In the method according to (7), the alkali metal hydroxide is lithium hydroxide, sodium hydroxide, or potassium hydroxide, the weak acid salt of alkali metals is sodium bicarbonate or sodium carbonate, the alkaline earth metal hydroxide is calcium hydroxide, barium hydroxide, or strontium hydroxide, the alkaline earth metal salt is calcium acetate, calcium chloride, barium acetate, or magnesium acetate, and the organic base is 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene, 1,1,3,3-tetramethylguanidine, 2-tert-butyl-1,1,3,3-tetramethylguanidine, or cetyltrimethylammonium hydroxide.

(9) In the method according to (1) to (8) above, the purifying agent contains the compound having the betaine structure as an active ingredient.

(10) In the method according to (9) above, the purifying agent is a carrier for concentrating a glycan in which a polymer whose side chain that has the betaine structure is bonded to a main chain thereof is immobilized on an insoluble support.

According to the above-described configurations, glycans can be released from a glycoprotein using a safe and unexpensive chemical in a short treatment time while suppressing the decomposition (peeling) of the glycan. Furthermore, when a purifying agent having effectively enhanced hydrophilicity is used, the free glycans that include O-linked glycans with a small molecular weight can be specifically adsorbed on the purifying agent. Accordingly, it is possible to efficiently collect glycans from the glycoprotein. Therefore, according to the above-described configurations, it is possible to prepare glycans from a glycoprotein through a simple operation in a short period of time in a high yield.

Also, with the configuration according to (2) above, the free glycans can be labeled by a labeling reagent. Furthermore, with the configuration according to (3) above, it is possible to reduce a complex of a glycan and a labeling reagent using a reducing reagent, and accordingly, to stabilize the complex between the glycan and the labeling reagent and to improve the labeling efficiency. In particular, it is possible to further improve the labeling efficiency of glycans by setting the concentration of the reducing reagent to the concentration range in the configuration according to (4) above.

(11) A kit for preparing a glycan from a glycoprotein includes:
(a) a hydroxylamine compound;
(b) a basic reagent; and
(c) a purifying agent for preparing a glycan having a length of a monosaccharide or more, the purifying agent being composed of a compound having a betaine structure.

(12) The kit according to (11) above further includes (d) a glycan labeling reagent.

(13) In the kit according to (11) or (12) above, the hydroxylamine compound is at least one selected from the group consisting of hydroxylamine, salts of hydroxylamine, O-substituted hydroxylamine, and salts of O-substituted hydroxylamine.

(14) In the kit according to any of claims (11) to (13), the basic reagent is at least one selected from the group consisting of alkali metal hydroxides, weak acid salts of alkali metals, alkaline earth metal hydroxides, alkaline earth metal salts dissolved in aqueous ammonia, and organic bases.

(15) In the kit according to (14) above, the alkali metal hydroxide is lithium hydroxide, sodium hydroxide, or potassium hydroxide, the weak acid salt of alkali metals is sodium bicarbonate or sodium carbonate, the alkaline earth metal hydroxide is calcium hydroxide, barium hydroxide, or strontium hydroxide, the alkaline earth metal salt is calcium acetate, calcium chloride, barium acetate, or magnesium acetate, and the organic base is 1,8-diazabicyclo[5.4.0] undec-7-ene, 1,5,7-Triazabicyclo[4.4.0]dec-5-ene, 7-Methyl-1,5,7-triazabicyclo[4.4.0]dec-5-ene, 1,1,3,3-Tetramethylguanidine, 2-tert-Butyl-1,1,3,3-tetramethylguanidine, or cetyltrimethylammonium hydroxide.

According to the above-described configurations, a glycan can be prepared more easily and in a short period of time by assembling reagents required for preparing the glycan from a glycoprotein into a kit.

(16) A device for preparing a glycan from a glycoprotein includes:
a first container holding portion configured to hold a first container in which a glycoprotein-containing sample that contains the glycoprotein is accommodated; a reagent introducing portion configured to introduce a reagent into the first container; and a second container holding portion configured to hold a second container that includes a purifying agent for purifying a glycan having a length of a monosaccharide or more, the purifying agent being composed of a compound having a betaine structure;
in which the reagent introducing portion includes a glycan releasing reagent introducing portion configured to introduce a glycan releasing reagent that contains a hydroxylamine compound and a basic reagent into the first container.

(17) In the device according to (16) above, the reagent introducing portion further includes a glycan labeling reagent introducing portion configured to introduce a glycan labeling reagent.

(18) The device according to (16) or (17) above further includes a solid-liquid separation portion configured to subject a content of the second container to solid-liquid separation.

According to the above-described configurations, a glycan can be prepared more easily and in a short period of time by assembling reagents and members required for preparing the glycan from a glycoprotein into a device.

BRIEF DESCRIPTION OF THE DRAWINGS

FIG. 5 is a graph showing the results of Example 3 obtained when examining the preparation of glycans, through a comparison between Comparative Example 4 and Comparative Example 5.

BEST MODE FOR CARRYING OUT THE INVENTION

Figure 1:
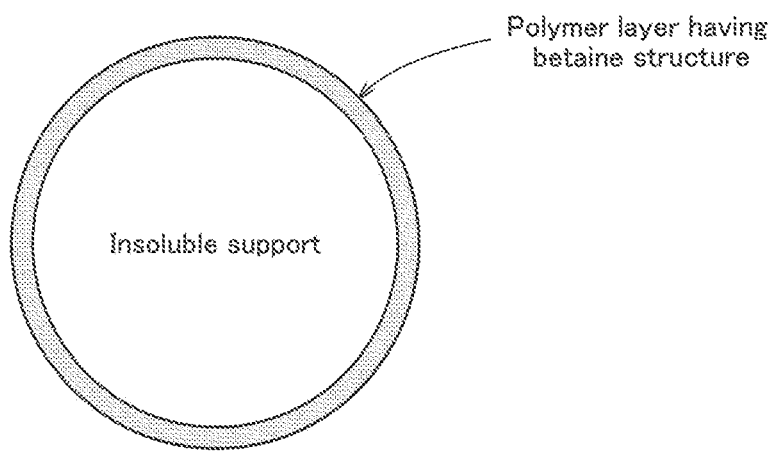
FIG. 1 is a diagram schematically showing an example of a glycan preparing and purifying agent according to an embodiment.

The following describes embodiments of the present invention in detail. However, the present invention is not limited to the embodiments, which will be described later.
Method for Preparing Glycan from Glycoprotein A method for preparing a glycan from a glycoprotein according to this embodiment includes:
(I) a step of obtaining a glycan-containing sample that contains a glycan by bringing a glycan releasing solution that contains a hydroxylamine compound and a basic reagent into contact with the glycoprotein and releasing the glycan from the glycoprotein;

(II) a step of adsorbing a glycan having a length of a monosaccharide or more on a purifying agent for purifying the glycan by bringing the glycan-containing sample into contact with the purifying agent, which is composed of a compound having a betaine structure; and (III) a step of eluting the glycan from the purifying agent, and thus the glycan can be prepared from the glycoprotein.

In this specification, a "glycoprotein" refers to a protein in which at least one or more O-linked glycans or N-linked glycans are linked to an amino acid sequence of the protein. There is no particular limitation on the glycoprotein targeted for the method for preparing a glycan from a glycoprotein, and the glycoprotein may be naturally derived or synthesized.

Also, a "glycan" may include an O-linked glycan and an N-linked glycan, and both the O-linked glycan and the N-linked glycan can be prepared from a glycoprotein. The O-linked glycan has a structure in which a glycan is linked to a side chain of an amino acid residue serine (Ser) or threonine (Thr) in a protein via an —OH group included in the amino acid side chain. Also, the O-linked glycans are classified into one to eight types according to the core structure. Also, the N-linked glycan refers to a glycan that is linked to a nitrogen atom of an amide group in a side chain of an asparagine residue of a protein. The N-linked glycans include glycans that form branches with mannose used as a base point, and examples thereof include two branched, three branched, and four branched glycans, and the like. Also, the N-linked glycans can be classified into basic, high mannose, hybrid, and complex types, and the like according to the structures thereof.

Step (I)/Glycan-Containing Sample Acquisition Step

Step (I) is a step of obtaining a glycan-containing sample that contains a glycan by bringing a glycan releasing solution containing a hydroxylamine compound and a basic reagent into contact with the glycoprotein and releasing the glycan from the glycoprotein.

There is no limitation on the order of the contact with a glycoprotein and mixing operations as long as a "glycan releasing solution" finally reaches a state in which the glycoprotein, hydroxylamines, and a basic reagent are in contact with each other. Hydroxylamines may first be added to a glycoprotein, and a basic reagent may be added thereto, for example. Alternatively, a basic reagent may first be added to a glycoprotein, and hydroxylamines may be added thereto. Alternatively, hydroxylamines and a basic reagent may first be mixed together, and a glycoprotein may be added thereto. Note that, in the case of O-linked glycans, it is preferable to first add hydroxylamines in order to suppress decomposition (peeling) of a glycan.

Here, examples of "hydroxylamines" that can be used for this embodiment include hydroxylamine, salts of hydroxylamine, O-substituted hydroxylamine, and salts of O-substituted hydroxylamine. Specifically, examples thereof include, but are not limited to, at least one compound selected from the group consisting of hydroxylamine hydrochloride, an aqueous solution of hydroxylamine, hydroxylamine sulfate, hydroxylamine phosphate, O-methylhydroxylamine hydrochloride, O-ethylhydroxylamine hydrochloride, O-(tetrahydro-2H-pyran-2-yl)hydroxylamine, nitrobenzyl hydroxylamine hydrochloride, O-(tert-butyldimethylsilyl)hydroxylamine, and O-(trimethylsilyl)hydroxylamine. Note that the above-described compounds may be used in combination of two or more. In a preferred embodiment, "hydroxylamines" are aqueous solutions of hydroxylamine.

The final concentration of "hydroxylamines" may be set to a concentration range of 2% (w/w) or more and 70% (w/w) or less, for example, and to a concentration range of 2% (w/w) or more and 50% (w/w) or less, for example. However, the final concentration thereof is not limited to the above-described concentration range, and can be adjusted by those skilled in the art as appropriate depending on the type of target glycoprotein, other components (amines, a basic reagent, and other additive agents), contact conditions (time, temperature, etc.), and the like.

In particular, the final concentration of "hydroxylamines" is preferably as high as possible in order to release O-linked glycans. Therefore, in order to release O-linked glycans, the final concentration of "hydroxylamines" may be set to a concentration range of 5% (w/w) or more and 70% (w/w) or less, for example, and to a concentration range of 10% (w/w) or more and 60% (w/w) or less, for example.

Note that, in order to release N-linked glycans, the final concentration of "hydroxylamines" may be set to a concentration range of 2% (w/w) or more and 50% (w/w) or less, and may be preferably set to a concentration range of 2% (w/w) or more and 20% (w/w) or less.

When hydroxylamine is used as "hydroxylamines", if the concentration of hydroxylamine is set to more than 2% (w/w) and 50% (w/w) or less, a sufficient amount of glycan can be collected, and hydroxylamine is likely to be stable.

Also, examples of the "basic reagent" that can be used in this embodiment include at least one compound selected from the group consisting of alkali metal hydroxides, weak acid salts of alkali metals, alkaline earth metal hydroxides, alkaline earth metal salts dissolved in aqueous ammonia, and organic bases.

Examples of alkali metal hydroxides are not limited to the following, and include lithium hydroxide, sodium hydroxide, and potassium hydroxide.

Also, examples of weak acid salts of alkali metals are not limited to the following, and include sodium bicarbonate and sodium carbonate.

Also, examples of alkaline earth metal hydroxides are not limited to the following, and include calcium hydroxide, barium hydroxide, and strontium hydroxide.

Also, examples of alkaline earth metal salts dissolved in aqueous ammonia are not limited to the following, and include calcium acetate, calcium chloride, barium acetate, and magnesium acetate.

In particular, lithium hydroxide is preferable.

Also, examples of organic bases are not limited to the following, and include DBU: 1,8-diazabicyclo[5.4.0]undec-7-ene, TBD: 1,5,7-Triazabicyclo[4.4.0]dec-5-ene, MTBD: 7-Methyl-1,5,7-triazabicyclo[4.4.0]dec-5-ene, TMG: 1,1,3,3-Tetramethylguanidine, t-BuTMG: 2-tert-Butyl-1,1,3,3-tetramethylguanidine), DBN: 1,5-diazabicydo[4.3.0]non-5-ene, and CTAH: cetyltrimethylammonium hydroxide. Note that the above-described compounds may be used in combination of two or more. In a preferred embodiment, an "organic base" is an organic strong base (with a $pK_a$ value of 12 or more), and specific examples thereof include DBU, TMG, TBD, MTBD, and CTAH. These DBU, TMG, TBD, MTBD, and CTAH are preferably used as organic bases because the bases can be removed after reaction through washing with an organic solvent The final concentration of "basic reagent" may be set to a concentration range of 2 mM or more and 10 M or less, for example. However, the final concentration thereof is not limited to the above-described concentration range, and can be adjusted by those skilled in the art as appropriate depending on the type of target glycoprotein, other components (hydroxylamines and other additive agents) in a reaction solution, reaction conditions (time, temperature, etc.), and the like. Note that, when lithium hydroxide is used as a "basic reagent", the final concentration thereof may be set to 6 mM or more and 8 M or less, for example. The reaction time can be shortened by setting the concentration of basic reagent to the above-described lower limit or more, and the influence of the remaining basic reagent on the subsequent process can be suppressed by setting the concentration of basic reagent to the above-described upper limit or less.

The mole ratio between hydroxylamines and a basic reagent is preferably set to 1:2 or more and 300:1 or less, and more preferably set to 1:1 or more and 100:1 or less. By setting the mole ratio between hydroxylamines and the basic reagent to the above-described range, it is possible to suppress decomposition (peeling) reaction of free glycan and to improve the yield of glycans.

There is no particular limitation on conditions (such as the temperature and the time) under which glycoproteins and a glycan releasing solution are contact with each other as long as glycans can be released from a target protein, and the conditions can be set by those skilled in the art as appropriate depending on the conditions such as the types and concentrations of the target glycoprotein, hydroxylamines, and basic reagent and the like. Note that the temperature may be set to a range of room temperature or higher and 80° C. or lower, for example. Note that glycan decomposition (peeling) rate can be reduced by lowering the reaction temperature. In particular, an N-glycolyl group and the like are likely to be decomposed in reaction at a high temperature. Therefore, if a target protein is a glycoprotein having an unknown glycan, the reaction temperature is preferably set to 50° C. or less, and may be set to about 37° C., for example. Also, the time may be set to about 5 minutes to 16 hours depending on conditions.

Amines may be further added to the glycan releasing solution. Examples of amines are not limited to the following, and may include at least one compound selected from the group consisting of aqueous ammonia, an aqueous solution of methylamine, an aqueous solution of dimethylamine, ethylamine, diethylamine, ethanolamine, ethylenediamine, butylamine, morpholine, DABCO, and anthranilic acid. Furthermore, note that the above-described compounds may be used in combination of two or more. Preferably, amines are aqueous ammonia, morpholine, DABCO, and anthranilic acid. Aqueous ammonia, morpholine, DABCO, and anthranilic acid are preferably used as amines because peeling, isomerization, and decomposition of amides are suppressed. In particular, morpholine, DABCO, anthranilic acid, and the like, which have a lower $pK_a$ value than that of ammonia, are preferably used because it is possible to suppress isomerization, which is a side reaction occurring when N-linked glycans are released.

The final concentration of "amines" may be set to a concentration range of 40 mM or more and 15 M or less, for example. However, the final concentration thereof is not limited to the above-described concentration range, and can be adjusted by those skilled in the art as appropriate depending on the type of target glycoprotein, other components (hydroxylamines, a basic reagent, and other additive agents) in a reaction solution, reaction conditions (time, temperature, etc.), and the like. Note that, when aqueous ammonia is used as amines, the final concentration of ammonia in the reaction solution may be set to 2% (w/w) or more and 25% (w/w) or less, and may be preferably set to 10% (w/w) or more and 20% (w/w) or less. More preferably, the final concentration thereof may be 20% (w/w).

Here, as described above, in particular, the final concentration of "hydroxylamines" is preferably as high as possible when releasing O-linked glycans. However, if a liquid mixture of glycoproteins and the reaction solution contains hydroxylamines in a high concentration, unreacted hydroxylamines may remain in the liquid mixture obtained after glycans are released. When glycans are labeled and analyzed, the unreacted hydroxylamines inhibit a labeling reaction, and thus it is preferable to remove the unreacted hydroxylamines.

In view of this, the preparation method may further include an additional step of removing unreacted hydroxylamines. Therefore, the preparation method may further include a step of adding a ketone, an aldehyde, or an acid anhydride to the glycan-containing sample to convert hydroxylamines remaining in the glycan-containing sample to a ketoxime, an aldoxime, or an amide.

Hydroxylamines can be converted to ketoximes through reaction with ketones. Hydroxylamines can be converted to aldoximes through reaction with aldehydes. Also, hydroxylamines can be converted to amides through reaction with acid anhydrides.

Acetone, methyl ethyl ketone, methyl isobutyl ketone, 4-hydroxybutanone, and the like may be used as ketones. Also, salicylaldehyde, benzaldehyde, 4-hydroxybenzaldehyde, and the like may be used as aldehydes. Also, acetic anhydride, succinic anhydride, and the like may be used as acid anhydrides.

Step (II)/Glycan Adsorption Step

Step (II) is a step of adsorbing a glycan having a length of a monosaccharide or more on a purifying agent for purifying the glycan by bringing the glycan-containing sample obtained in Step (I): the glycan-containing sample acquisition step into contact with the purifying agent, which is composed of a compound having a betaine structure. Glycans having a length of a monosaccharide or more can be efficiently adsorbed on the purifying agent.

The "purifying agent" used in this embodiment may be referred to as a purifying agent for purifying glycans with a length of monosaccharide or more, the purifying agent containing a compound having a betaine structure as an active ingredient. That is, the "purifying agent" may be in the form of mixture with a compound that does not have a betaine structure as long as the purifying agent contains a compound having a betaine structure.

The above-described "betaine structure" may be a structure represented by Formula (1) below.

$$-A-L- \qquad (1)$$

[where in Formula (1), Z represents a cationic group selected from the group consisting of a secondary amino group, a tertiary amino group, a quaternary ammonium group, and an imino group, L represents an alkylene group with 1 to 10 carbon atoms, and A represents an anionic group selected from the group consisting of a phosphate group, a carboxyl group, a phosphonate group, a phosphinate group, a sulfonate group, a sulfine group, a sulfene group, a hydroxy group, a thiol group, and a boronic acid group].

The above-described compound having the betaine structure may be betaine, or a polymer in which a side chain having a betaine structure is bonded to a main chain thereof.

The "main chain" refers to the longest carbon chain in the polymer structure, and the structure branched from the main chain is referred to as a "side chain".

Also, glycans include monosaccharides. Thus, a glycan having a length of monosaccharide or more include a glycan having a length of monosaccharide, disaccharide, trisaccharide, or tetrasaccharide or more. The molecular weight of a glycan having a length of monosaccharide or more may be about 150 or more and 3000 or less, for example.

The "purifying agent" may be immobilized on an insoluble support to form a carrier for concentrating glycans. "Purification" may also be referred to as "concentration", and a "carrier for concentrating a glycan" may be simply referred to as a "carrier". In a "purifying agent", a polymer may be immobilized on an insoluble support, and a side chain having a betaine structure may be bonded to a main chain in this polymer, for example. The hydrophilicity is extremely increased due to the side chain having a betaine structure, and hydrophilic interaction makes it possible to strongly retain high hydrophilic glycans.

In the "carrier for concentrating a glycan", a polymer is immobilized on an insoluble support, and preferably, the polymer covers the entire or a portion of the surface of the insoluble support, forming a polymer layer. Here, "covering" refers to a polymer being attached to the surface of the insoluble support. FIG. 1 schematically shows an example of the "carrier for concentrating a glycan". The "carrier for concentrating a glycan" shown in FIG. 1 is provided with a polymer layer having a betaine structure on the surface of an insoluble support.

The "polymer layer" may contain a polymer that does not have a betaine structure, in addition to the polymer whose side chain having a betaine structure is bonded to the main chain thereof. Therefore, the "carrier for concentrating a glycan" enables the purification of a glycan having a length of monosaccharide or more as long as the surface of this carrier has a betaine structure.

The "insoluble support" is a base member that is insoluble in water and an organic solvent that is to be used in a process for preparing the glycan, and is not particularly limited as long as it can immobilize a polymer whose side chain having a betaine structure is bonded to the main chain thereof, and a known base member can be used. The material of the insoluble support may be either an inorganic substance or an organic substance, or may be a composite substance in which an inorganic substance and an organic substance are used in combination. Examples of the inorganic substance include silicon compounds such as silica, glass such as silicate glass, oxides such as iron oxide (ferrite, magnetite, etc.), alumina, titania, and zirconia, metals such as iron, copper, gold, silver, platinum, cobalt, aluminum, palladium, iridium, and rhodium and alloys thereof, and carbon materials such as graphite. These may be used alone or in combination of two or more. Examples of the organic substance include synthetic polymers such as crosslinked polyvinyl alcohol, crosslinked polyacrylate, crosslinked polyacrylamide, and crosslinked polystyrene, and polysaccharides such as crosslinked Sepharose, crystalline cellulose, crosslinked cellulose, crosslinked amylose, crosslinked agarose, and crosslinked dextran. These may be used alone or in combination of two or more. Also, a polymer whose side chain having a betaine structure is bonded to the main chain thereof may form an insoluble support.

It is preferable to use an inorganic substance as an insoluble support, and a silicon compound is more preferable, and silica is particularly preferable. An organic substance, which may serve as an insoluble support, usually has a specific gravity of about 1, and solid-liquid separation is likely to be complicated due to the difference in specific gravity between the organic substance and the glycan-containing sample being small. When a carrier for concentrating a glycan in which an inorganic substance is employed is used to concentrate the glycan, for example, it is possible to perform solid-liquid separation easily and simply, and to effectively separate the glycan adsorbed on the carrier from impurities such as free proteins, peptide fragments, lipids, and salts. This can contribute to improvement of the efficiency of concentrating glycans. Also, an inorganic substance can impart appropriate strength to a carrier.

The insoluble support may be a support having voids, such as a porous body or a hollow body. Examples of the porous body include monolithic silica. Monolithic silica is a silica porous structure that has micrometer-sized three-dimensional mesh-like pores (micropores), and nanometer-sized pores (mesopores) in a silica skeleton that forms a three-dimensional mesh-like structure. It is possible to independently control the pore size of micropores to be in a range of 1 μm or more and 100 μm or less, for example, and preferably 1 μm or more and 50 μm or less, and the pore size of mesopores to be in a range of 1 nm or more and 100 nm or less, for example, and preferably 1 nm or more and 70 nm or less. The specific surface area of the carrier for concentrating a glycan is increased by using an insoluble support having such voids, and it is possible to increase the amount of purifying agent to be immobilized on the surface of the insoluble support. Accordingly, when the carrier of this embodiment is used to concentrate glycans, the efficiency of contact with the glycans can be improved, the glycans can be efficiently adsorbed, which contributing to the improvement of the glycan concentration efficiency. Furthermore, it is also possible to use the carrier in order to adjust the specific gravity of an insoluble support, which will be described later.

If the purifying agent is a polymer, this polymer may be a polymer of polymerizable monomers. There is no particular limitation on the polymerizable monomer as long as it can form a polymer through a polymerization reaction. The polymerizable monomer is preferably a (meth)acrylic compound having a (meth)acryloyl group, including (meth) acrylic acid ester and derivatives thereof, for example. Furthermore, examples thereof include, but are not limited to, compounds that have a vinyl group, an allyl group, an α-alkoxymethylacryloyl group, a maleic acid residue, a fumaric acid residue, an itaconic acid residue, a crotonic acid residue, an isocrotonic acid residue, a citraconic anhydride residue, and the like, and derivatives thereof. The polymerizable monomers may be used alone or in combination of two or more. Note that the "(meth)acryloyl group" represents "acryloyl group" or "methacryloyl group", and the "(meth)acrylic" represents "acrylic" or "methacrylic".

A side chain of the polymer to be immobilized on the insoluble support is a molecular chain branched from the main chain thereof that is composed of the polymer of the above-described polymerizable monomer, and some or all of them have a betaine structure. The "betaine structure" refers to a structure that has a cationic site and an anionic site at positions where they are separated from each other and are not adjacent to each other in the same molecule.

The "cationic site" is a positively charged atomic group, and refers to a so-called cationic group. Examples of the cationic group include, but are not limited to, a primary amino group, a secondary amino group (—NHR), a tertiary amino group (—NR$_2$), a quaternary ammonium group (—NR$_3^+$), and an imino group. "R" in the secondary amino group, the tertiary amino group, and the quaternary ammonium group represents an alkyl group or an aryl group. If one group has multiple numbers of R, they may be different from each other or may be the same. Examples thereof include, but are not limited to, a methyl group, an ethyl group, and a propyl group. R preferably represents a quaternary ammonium group, and particularly preferably a trimethyl ammonium group. Also, examples of the cationic group include salts formed with fluoride ions, chloride ions, bromide ions, iodide ions, hydrochloric acid ions, acetate ions, sulfate ions, hydrofluoride ions, and carbonate ions.

The "anionic site" is a negatively charged atomic group, and refers to a so-called anionic group. Examples of the anionic group include, but are not limited to, a phosphate group, a phosphonate group, a phosphinate group, a sulfonate group, a sulfine group, a sulfene group, a carboxyl group, a hydroxy group, a thiol group, and a boronic acid group. The phosphate group is preferable. Furthermore, examples of the anionic group also include salts formed with alkali metal ions such as sodium ions and potassium ions and alkaline earth metal ions such as calcium ions.

There is no particular limitation on the "betaine structure" as long as it has a structure having the above-described cationic and anionic sites, and there is no particular limitation on a combination of the cationic site and the anionic site. Preferably, the cationic site is a quaternary ammonium group, and the anionic site is a phosphate group.

There is no particular limitation on a polymer to be immobilized on an insoluble support as long as its side chain having a betaine structure is bonded to its main chain that is composed of a polymer of polymerizable monomer. Therefore, the polymer may be a copolymer of a polymerizable monomer having a cationic site and a polymerizable monomer having an anionic site, in addition to a homopolymer of a polymerizable monomer having a betaine structure. Also, the polymer may be a copolymer containing a polymerizable monomer having no charge, and the solubility of the polymer in water and the like can be controlled due to the polymer containing such a polymerizable monomer. A copolymer refers to a polymer obtained from two or more types of monomers, and may be any one of an alternating copolymer, a block copolymer, a random copolymer, a graft copolymer, and the like. Therefore, the betaine structure may be introduced for each monomer unit of the polymer, may be introduced for every certain monomer units, or may be introduced at random.

Preferably, the polymer side chain is a homopolymer of a polymerizable monomer having a betaine structure. In this case, the anionic site and the cationic site are present in the same molecular chain in the polymerizable monomer having the betaine structure. There is no particular limitation on a linker for linking them together as long as it has a divalent or higher valent group, and a known linker can be used. An alkylene linker is preferable, and examples of the alkylene linker include alkylene linkers having 1 or more and 10 or less carbon atoms, preferably 2 or more and 5 or less carbon atoms.

Examples of such a polymerizable monomer having a betaine structure include, but are not limited to, a phosphobetaine-based monomer having a phosphobetaine group such as a phosphorylcholine group, a carboxybetaine-based monomer having a carboxybetaine group, and a sulfobetaine-based monomer having a sulfobetaine group. A phosphobetaine-based monomer is preferable, and in particular, a phosphobetaine-based monomer having a phosphorylcholine group is preferable.

Examples of the polymerizable monomer having a phosphorylcholine group as the phosphobetaine-based monomer preferably include 2-(meth)acryloyloxyethyl phosphorylcholine, 2-(meth)acryloyloxyethoxyethyl phosphorylcholine, 6-(meth)acryloyloxyhexyl phosphorylcholine, 10-(meth)acryloyloxyethoxynonyl phosphorylcholine, 2-(meth)acryloyloxypropyl phosphorylcholine, and 2-(meth)acryloyloxybutyl phosphorylcholine. In particular, 2-(meth)acryloyloxyethyl phosphorylcholine is particularly preferable due to its availability. Furthermore, examples of the phosphobetaine-based monomer include dimethyl(2-methacryloyloxyethyl)(2-phosphonatoethyl)aminium, dimethyl(2-acryloyloxyethyl)(2-phosphonatoethyl)aminium, dimethyl(2-methacryloyloxyethyl)(3-phosphonatopropyl) aminium, dimethyl(2-acryloyloxyethyl)(3-phosphonatopropyl)aminium, dimethyl(2-methacryloyloxyethyl)(4-phosphonatobutyl)aminium, dimethyl(2-acryloyloxyethyl)(4-phosphonatobutyl)aminium, dimethyl(2-methacryloyloxyethyl)(phosphonatomethyl)aminium, and dimethyl(2-acryloyloxyethyl)(phosphonatomethyl)aminium.

Examples of the carboxybetaine-based monomer include dimethyl(2-methacryloyloxyethyl)(2-carboxylatoethyl)aminium, dimethyl(2-acryloyloxyethyl)(2-carboxylatoethyl)aminium, dimethyl(2-methacryloyloxyethyl)(3-carboxylatopropyl)aminium, dimethyl(2-acryloyloxyethyl)(3-carboxylatopropyl)aminium, dimethyl(2-methacryloyloxyethyl)(4-carboxylatobutyl)aminium, dimethyl(2-acryloyloxyethyl)(4-carboxylatobutyl)aminium, dimethyl(2-methacryloyloxyethyl)(carboxylatomethyl)aminium, and dimethyl(2-acryloyloxyethyl)(carboxylatomethyl)aminium.

Examples of the sulfobetaine-based monomer include dimethyl(2-methacryloyloxyethyl)(2-sulfonatoethyl)aminium, dimethyl(2-acryloyloxyethyl)(2-sulfonatoethyl)aminium, dimethyl(2-methacryloyloxyethyl)(3-sulfonatopropyl)aminium, dimethyl(2-acryloyloxyethyl)(3-sulfonatopropyl)aminium, dimethyl(2-methacryloyloxyethyl)(4-sulfonatobutyl)aminium, dimethyl(2-acryloyloxyethyl)(4-sulfonatobutyl)aminium, dimethyl(2-methacryloyloxyethyl)(sulfonatomethyl)aminium, and dimethyl(2-acryloyloxyethyl)(sulfonatomethyl)aminium.

The weight of the polymer bonded to the insoluble support is preferably about 0.5 mg or more and 1.5 mg or less per unit surface area ($m^2$) of the insoluble support, particularly preferably 0.6 mg or more and 1.3 mg or less, and even more preferably 0.7 mg or more and 1.2 mg or less. When the polymer weight per unit surface area is in the above-described range, the polymer can be easily handled during polymer synthesis, and it is possible to ensure good efficiency of contact with glycans and efficiently adsorb glycans.

The "carrier for concentrating a glycan" preferably has a specific gravity of about 1.05 or more and 3.00 or less, particularly preferably has a specific gravity of 1.1 or more and 2.7 or less, and even more preferably has a specific gravity of 1.5 or more and 2.5 or less. When the specific gravity thereof is less than the lower limit, the sedimentation properties deteriorate, and when the specific gravity exceeds the upper limit, the dispersibility deteriorate. Therefore, operability deteriorates in any cases. Therefore, if the specific gravity of the carrier according to this embodiment is in the above-described range and this carrier is used to concentrate glycans, for example, solid-liquid separation can be performed easily and simply through spontaneous sedimentation by gravity, centrifugation, or the like due to the carrier having good sedimentation properties, and it is possible to effectively separate glycans adsorbed on the carrier and impurities such as free proteins and peptide fragments. Also, the contact efficiency with glycans is improved due to good dispersibility, and the glycans can be efficiently adsorbed. Therefore, it is possible to provide a carrier having good operability, and if the carrier is used to concentrate glycans, for example, it is possible to provide a carrier that has good efficiency in separation from impurities such as free proteins and peptide fragments, and has good glycan adsorption efficiency.

The shape of "carrier for concentrating a glycan" is not particularly limited, and the "carrier for concentrating a glycan" may have any known shape. Examples thereof include a spherical shape such as beads, a plate shape such as a substrate or a multi-well plate, a film shape such as a sheet, a film, or a membrane, and a fibrous shape. The carrier can be rephrased as a solid phase. The carrier preferably has a shape that facilitates handling, such as a spherical shape or a shape similar thereto. If the carrier is spherical, the average particle size is preferably about 0.5 µm or more and 100 µm or less, and particularly preferably 1 µm or more and 50 µm or less, or preferably 1 µm or more and 10 µm or less. Particularly preferably, the average particle size thereof is 3 µm or more and 10 µm or less. If the average particle size is less than the lower limit, it is difficult to collect the carrier through centrifugation or filtration, and, when a column or the like is filled with the carrier, liquid permeability will deteriorate and a large pressure need be applied when liquid flows therethrough. On the other hand, if the average particle size exceeds the upper limit, the contact area between the carrier and a sample solution decreases, glycan adsorption efficiency decreases, and the glycan concentration efficiency decreases. Therefore, when the average particle size of the "carrier for concentrating a glycan" is in the above-described range, it is possible to provide a carrier with high operability and provide a carrier with good operability, and, it is possible to provide a carrier that has good efficiency in separation from free peptide fragments and the like and has good glycan adsorption efficiency if the carrier is used to concentrate glycans, for example. The average particle size can be measured using a particle size distribution meter or the like, for example.

The "carrier for concentrating a glycan" may be used in a state in which a filter cup of a spin column etc., wells of a multi-well plate, wells of a filter plate, or a container such as a microtube is filled with the carrier.

Although the polymer can be obtained by polymerizing the above-described polymerizable monomer, a polymer polymerization method is not particularly limited and can be selected as appropriate according to the type of polymerizable monomer and the like. Radical polymerization is preferable.

The polymer may be immobilized on an insoluble support through either physical adsorption or chemical bonding. From the viewpoint of safety, chemical bonding is preferable, and it is possible to suppress elution of polymer from the insoluble support. Also, the polymer may be immobilized on the surface of the insoluble support by polymerizing a polymerizable monomer on the surface of the insoluble support, or a prepolymerized polymer may be immobilized on the surface of the insoluble support.

If the polymer is immobilized on the surface of the insoluble support by polymerizing a polymerizable monomer on the surface of the insoluble support, a polymerization initiation point may be introduced on the surface of the insoluble support, the insoluble support provided with the polymerization initiation point may be immersed in a polymerizable monomer solution, and a polymerization initiator may be added to grow the polymer from the polymerization initial point, for example. Accordingly, the polymer can be immobilized on the surface of the insoluble support through chemical bonding. A polymerizable functional group, a chain transfer group, a dormant species in living radical polymerization, or the like can be used as the polymerization initiation point.

Examples of the polymerizable functional group include a vinyl group, an allyl group (2-propenyl group), a (meth) acryloyl group, an epoxy group, and a styrene group. Examples of the chain transfer group include a mercapto group and an amino group, and the mercapto group is preferable because it has higher reactivity.

Although not particularly limited, it is preferable to use a silane coupling agent having a polymerizable functional group or a chain transfer group as a method for introducing a polymerizable functional group or a chain transfer group on the surface of the insoluble support.

Examples of the silane coupling agent having a polymerizable functional group include (3-methacryloxypropyl) dimethylmethoxysilane, (3-methacryloxypropyl)diethylmethoxysilane, (3-methacryloxypropyl) dimethylethoxysilane, (3-methacryloxypropyl) diethylethoxysilane, (3-methacryloxypropyl) methyldimethoxysilane, (3-methacryloxypropyl) ethyldimethoxysilane, (3-methacryloxypropyl) methyldiethoxysilane, (3-methacryloxypropyl) ethyldiethoxysilane, (3-methacryloxypropyl) trimethoxysilane, and (3-methacryloxypropyl) triethoxysilane. From the viewpoint of reactivity and availability, (3-methacryloxypropyl)trimethoxysilane and (3-methacryloxypropyl)triethoxysilane are preferable. These silane coupling agents may be used alone or in combination of two or more.

Examples of the silane coupling agent having a chain transfer group include (3-mercaptopropyl)trimethoxysilane, (3-mercaptopropyl)methyldimethoxysilane, (3-mercaptopropyl)dimethylmethoxysilane, (3-mercaptopropyl)triethoxysilane, (3-mercaptopropyl)methyldiethoxysilane, (3-mercaptopropyl)dimethylethoxysilane, (mercaptomethyl)trimethoxysilane, (mercaptomethyl)methyldimethoxysilane, (mercaptomethyl)dimethylmethoxysilane, (mercaptomethyl)triethoxysilane, (mercaptomethyl) methyldiethoxysilane, and (mercaptomethyl) dimethylethoxysilane, and (3-mercaptopropyl) trimethoxysilane and (3-mercaptopropyl)triethoxysilane are preferable from the viewpoint of availability. These silane coupling agents may be used alone or in combination of two or more.

As a result of forming a covalent bond between a silane coupling agent having a polymerizable functional group or a chain transfer group and a functional group on the surface of the insoluble support, the polymerizable functional group or the chain transfer group can be introduced onto the insoluble support using the silane coupling agent, for example. If alkoxysilanes such as trimethoxysilanes and triethoxysilanes are used as a silane coupling agent, for example, the polymerizable functional group or the chain transfer group can be introduced as a result of a silanol group generated through hydrolysis and a hydroxy group, an amino group, a carbonyl group, or a silanol group present on the surface of the insoluble support undergoing dehydration and condensation to form a covalent bond.

A polymer layer is formed on the surface of the insoluble support by introducing the polymerizable functional group or the chain transfer group on the surface of the insoluble support, and then mixing the insoluble support and the polymerizable monomer together to proceed the polymerization reaction. Although there is no limitation on the polymerization reaction, the polymerization reaction is performed by introducing the insoluble support into a solvent in which a polymerizable monomer and a polymerization initiator are dissolved, and heating the mixture at a temperature of 0° C. or more and 80° C. or less for 1 hour or more and 30 hours or less under stirring, for example. Thereafter, the insoluble support is filtered under vacuum pressure, and is cleaned and dried.

The ratio of the used insoluble support, polymerizable monomer, and polymerization initiator is not particularly limited, and they are usually used in a ratio of 0.1 mmol or more and 10 mmol or less of the polymerizable monomer and 0.01 mmol or more and 10 mmol or less of the polymerization initiator relative to 1 g of the insoluble support.

Any solvent can be used as long as the corresponding polymerizable monomer is soluble, and examples thereof include alcohols such as methanol, ethanol, isopropanol, n-butanol, t-butyl alcohol, and n-pentanol, benzene, toluene, tetrahydrofuran, dioxane, dichloromethane, chloroform, cyclohexanone, N,N-dimethylformamide, dimethyl sulfoxide, methyl acetate, ethyl acetate, butyl acetate, methyl ethyl ketone, methyl butyl ketone, ethylene glycol monoethyl ether, ethylene glycol monomethyl ether, and ethylene glycol monobutyl ether. These solvents are used alone or in combination of two or more.

Examples of the polymerization initiator include, but are not particularly limited to, azo compounds such as 2,2'-azobisisobutylnitrile (may be abbreviated as "AIBN"), and 1,1'-azobis(cyclohexane-1-carbonitrile), organic peroxides such as benzoyl peroxide, lauryl peroxide, and tert-butyl peroxide, and redox initiators such as hydrogen peroxide-ferrous iron.

On the other hand, if a prepolymerized polymer is immobilized on the surface of the insoluble support, a method for physically adsorbing the prepolymerized polymer on the insoluble support, or a method for chemically bonding the prepolymerized polymer thereto may be used, for example. Preferably, a component that is likely to be adsorbed on the insoluble support, or a component that has a functional group that can react with a reactive functional group that is present on the surface of the insoluble support is incorporated into a polymer as a copolymer during the polymerization of the polymer. As the functional group that can react with the reactive functional group that is present on the surface of the insoluble support, for example, a silanol group and the like are preferable due to having high reactivity, the silanol group being obtained through hydrolysis of a silane coupling agent and the like, and the silanol group can form a covalent bond through dehydration and condensation with a hydroxy group, an amino group, a carbonyl group, a silanol group, and the like on the surface of a solid support, for example. The polymerization reaction of the polymerizable monomer can be carried out according to the above.

The polymer can be adsorbed on or chemically bonded to the surface of the insoluble support by applying the polymer to the surface of the insoluble support. Examples of the coating method include known methods such as a method for preparing a polymer solution, and immersing the support therein or spraying the polymer solution thereto. After the polymer is applied thereto, it is preferable to dry it at room temperature or through heating. If the polymer is chemically bonded thereto, reactions may be carried out under the corresponding reaction conditions. Accordingly, the polymer layer is formed on the surface of the insoluble support.

The "carrier for concentrating a glycan" is obtained by introducing a chain transfer group such as a mercapto group onto the surface of inorganic particles whose surfaces have hydroxy groups, such as silica beads serving as the insoluble supports, and synthesizing the polymer layer having a betaine structure thereon. First, the chain transfer groups are introduced on the surface of inorganic particles using a silane coupling agent having a chain transfer group. At this time, the silanol group generated through hydrolysis of a hydrolyzable group such as an alkoxy group of the silane coupling agent and a hydroxy group on the surface of inorganic particles undergo dehydration and condensation to form a covalent bond, and thus the chain transfer group is introduced. Then, the inorganic particles provided with the chain transfer group and a (meth)acrylic monomer in which at least some of the monomers have a betaine structure are radically polymerized through addition of a polymerization initiator in an appropriate solvent. The chain transfer group introduced on the inorganic particles serve as the polymerization initiation point, the surface of inorganic particles is coated with a polymer layer having a betaine structure, and thus the polymer layer is formed.

A purifying agent and the glycan-containing sample obtained in Step (I): the glycan-containing sample acquisition step are brought into contact with each other. At this time, the glycan-containing sample may be desalted or the like using a known method. Because the purifying agent has increased hydrophilicity, glycans can be specifically adsorbed thereon due to hydrophilic interaction, and a large number of peptide fragments and the like that are present in the sample are not adsorbed on the purifying agent and remain in a free state.

The glycan retention force of the purifying agent is proportional to the concentration of the organic solvent. Therefore, an organic solvent or a mixed solvent of an organic solvent and water can be used as a solvent of the reaction solution for adsorbing glycans on the purifying agent. The solvent can be selected as appropriate depending on the type of glycan to be concentrated or the like. There is no particular limitation on the organic solvent as long as glycan can be dissolved therein, and examples thereof include acetonitrile, tetrahydrofuran, acetone, dioxane, pyridine, methanol, ethanol, 1-propanol, 2-propanol, and 1-butanol. Preferably, organic solvents such as 1-butanol and ethanol are suitably used. It is possible to use various buffer solutions in order to adjust the pH. Also, if a mixed solvent of an organic solvent and water is used, the mixing ratio of the organic solvent and water is 3:1 or more and 1000:1 or less in terms of volume ratio, for example.

The purifying agent on which glycans are adsorbed can be cleaned as needed. It is possible to remove impurities such as proteins, peptide fragments, lipids, and salts other than the glycans adsorbed on the purifying agent through cleaning. It is possible to use the above-described solvent as a cleaning liquid, for example.

Step (III)/Glycan Elution Step

Step (III) is a step of eluting the glycans from the purifying agent on which the glycans have been adsorbed in Step (II): the glycan adsorption step.

It is possible to use an organic solvent or a mixed solvent of an organic solvent and water as an eluent for eluting the adsorbed glycans from the purifying agent, and to select the eluent as appropriate according to the types of glycan to be eluted and purifying agent. The above-described solvent can be used as the organic solvent. Also, it is possible to efficiently elute glycans by using a highly hydrophilic solvent in this step. It is also possible to use water without using an organic solvent, and to use a mixed solvent of an organic solvent and water, for example. If a mixed solvent is used, the volume ratio of the organic solvent to water is 3 or less, for example, and particularly preferably, only water can be used without using an organic solvent.

There are no limitation on Step (II): the glycan adsorption step and Step (III): the glycan elution step, and some or all of the steps may be performed using a batch method, a spin column method, or the like. Although the batch method and the spin column method will be described later in detail, the reagents, reaction conditions, and the like are as described above.

Batch Method

If a batch method is used, the glycans are adsorbed on the purifying agent by bringing the glycan-containing sample obtained in Step (I): the glycan-containing sample acquisition step and the purifying agent used in this embodiment into contact with each other in an appropriate container (e.g., a microtube, a centrifuge tube, a microplate, or the like) (Step (II)). At this time, the purifying agent is preferably immobilized on the insoluble support. Then, the purifying agent-glycan complex is subjected to solid-liquid separation, and the liquid phase portion containing impurities such as proteins, peptide fragments, lipids, and salts is removed, and only the complex is collected. Solid-liquid separation can be performed through spontaneous sedimentation by gravity, centrifugation, or the like, and the liquid phase portion can be removed through suction or the like. Also, solid-liquid separation may be performed through accumulation of complex using magnetic force by adding a magnetic material such as ferrite to the insoluble support for this carrier. In that case, centrifugation or the like need not be performed. Also, solid-liquid separation may be performed through filtration by passing a mixture through a filter, and at this time, it may be performed under vacuum pressure or under pressure.

Then, the purifying agent on which glycans are adsorbed is cleaned. It is possible to remove impurities such as proteins and peptide fragments other than the glycans adsorbed on the purifying agent through cleaning. Cleaning can be performed by immersing the purifying agent on which the glycans are adsorbed in a cleaning liquid in an appropriate container, and repeating the replacement of the cleaning liquid. The purifying agent on which the glycans are adsorbed is introduced into an appropriate container, a cleaning liquid is added thereto, the resulting mixture is shaken or stirred, operation for removing the liquid phase portion through solid-liquid separation is repeated, and thereby the purifying agent can be cleaned, for example. Solid-liquid separation can be performed as described above.

After cleaning is performed, the glycans are eluted from the purifying agent on which the glycans are adsorbed (Step (III)). The glycans can be eluted by immersing the purifying agent in the eluent. After the cleaning liquid is sufficiently removed, an appropriate amount of the eluent is added to the carrier on which the glycans are adsorbed, and the resulting mixture is shaken or stirred, for example. Then, the carrier is collected through solid-liquid separation, and the eluate is collected in a new appropriate container (e.g., a collection tube or a collection plate, etc.). Solid-liquid separation can be performed as described above. The glycans can be concentrated through distillation of the eluate as needed.

Spin Column Method

If a spin column method is used, a container having a built-in filter or the like, such as a filter cup, may be used. It is possible to use a filter cup having opening portions at the upper portion and the lower portion thereof, and the lower opening portion is covered with a filter, for example. If a filter cup is used, the glycan-containing sample obtained in Step (I): the glycan-containing sample acquisition step is introduced in the filter cup filled with the purifying agent used in this embodiment, and the purifying agent and the sample are brought into contact with each other in the reaction solution by passing the sample through the filter cup. The purifying agent is preferably immobilized on the insoluble support. The sample may be passed through free fall due to gravity and centrifugation, or the like, or may be passed under vacuum pressure or under pressure. After the sample has passed therethrough, the discharged liquid, which contains free proteins, peptide fragments, lipids, salts, and the like that have passed through the purifying agent, is removed.

Then, the purifying agent on which glycans are adsorbed is cleaned. It is possible to remove impurities such as proteins, peptide fragments, lipids, and salts other than the glycans adsorbed on the purifying agent through cleaning. Cleaning can be performed by passing the cleaning liquid through the purifying agent in the filter cup, and cleaning can be continuously performed from adsorption of glycans. The cleaning liquid can be passed as described above.

After cleaning is performed, the glycans are eluted from the purifying agent on which the glycans are adsorbed. The glycans can be continuously eluted by passing the eluent through the purifying agent in the filter cup through cleaning operation from adsorption of glycans. The eluent that has passed through the purifying agent is collected in an appropriate container (e.g., a collection tube, a collection plate, or the like). The eluent can be passed as described above. The glycans can be concentrated through distillation of the eluate as needed.

Step (IV)/Glycan Labeling Step

Step (IV) is a glycan labeling step of reacting a glycan labeling reagent in a glycan labeling solution and the glycans with each other, and the method for preparing a glycan from a glycoprotein of this embodiment may include Step (IV) as needed.

The "glycan labeling solution" contains at least a "glycan labeling reagent", and may contain water, a buffer solution, and/or an organic solvent, or the like. The glycan labeling solution may have ultraviolet absorption characteristics or fluorescence characteristics. Due to the above-described characteristics being provided, it is possible to perform detection using an analyzer, such as LC-MS.

There is no particular limitation on the "glycan labeling reagent" as long as it has a reactive group for a glycan and a modification group to be attached to the glycan. Examples of the reactive group for the glycan include an oxylamino group, a hydrazide group, an amino group, and an active ester group. The modification group can be selected by those skilled in the art as appropriate according to a method for analyzing a glycan.

If the glycan labeling reagent has an amino group as a reactive group for a glycan, it is possible to use a compound having an amino group having ultraviolet absorption characteristics or fluorescence characteristics as the glycan labeling reagent, for example. In such a compound having an amino group, examples of the modification group to be attached to the glycan include an aromatic group. When a labeling compound having an amino group and an aromatic group is used, modification is performed through reductive amination. Because the aromatic group has ultraviolet-visible absorption characteristics and fluorescence characteristics, the aromatic group is preferable due to detection sensitivity in UV detection or fluorescent detection being improved.

Specific examples of the labeling compound that provides such an aromatic group include 8-aminopyrene-1,3,6- trisulfonate, 8-aminonaphthalene-1,3,6-trisulphonate, 7-amino-1,3-naphtalenedisulfonic acid, 2-amino9(10H)-acridone, 5-aminofluorescein, dansylethylenediamine, 2-aminopyridine, 7-amino-4-methylcoumarine, 2-aminobenzamide, 2-aminobenzoic acid, 3-aminobenzoic acid, 7-amino-1-naphthol, 3-(acetylamino)-6-aminoacridine, 2-amino-6-cyanoethylpyridine, ethyl p-aminobenzoate, p-aminobenzonitrile, and 7-aminonaphthalene-1,3-disulfonic acid.

In particular, the compound having an amino group may contain 2-aminobenzamide. 2-Aminobenzamide may be preferable because 2-aminobenzamide is less likely to be influenced by impurities such as proteins, peptide fragments, lipids, and salts even in a large reaction scale. Note that derivatives of the above-described compound are also preferably used as long as the function of the labeling compound can be maintained.

If the glycan labeling solution contains a buffer solution, examples of a buffer agent include ammonium carbonate, ammonium hydrogen carbonate, ammonium chloride, diammonium hydrogen citrate, and ammonium carbamate. Although there is no particular limitation on the pH of the buffer solution, the pH thereof is preferably 5 to 10.

If the glycan labeling solution contains an organic solvent, examples of the organic solvent may include one or more selected from the group consisting of an aprotic polar organic solvent, a protic polar organic solvent, and an aprotic non-polar organic solvent. Specific examples of the organic solvent include aprotic polar organic solvents such as dimethylsulfoxide (DMSO), dimethylformamide (DMF), and N-methylpyrrolidone (NMP), protic polar organic solvents such as organic acids (formic acid, acetic acid, propionic acid, butyric acid, and the like) and alcohols (methanol, ethanol, propanol, and the like), and aprotic non-polar organic solvents such as hexane. These solvents may be used alone or in combination of two or more.

From the viewpoint of more preferably obtaining the effect of shortening the time required for the glycan labeling step, it is possible to use an organic acid such as formic acid, acetic acid, propionic acid, or butyric acid as an organic solvent. In particular, from the viewpoint of performing operation with ease, it is possible to use acetic acid as an organic acid.

If the boiling point of the protic polar organic solvent is relatively low (e.g., if the boiling point is less than 140° C.), in addition to a protic solvent, a solvent whose boiling point is higher than that of this protic solvent may be used in combination. Accordingly, it is possible to reduce the volatilization rate of the above-described protic polar organic solvent having a relatively low boiling point in the glycan labeling step. As a result, it is possible to suppress undesired precipitation of unreacted substances in the glycan labeling step. Accordingly, it is possible to obtain a labeled glycan in high yield. It is possible to select a mode in which such a solvent with a higher boiling point (referred to as a high boiling point solvent hereinafter) is used in combination, in a case where the scale of glycan is small, in a case where the amount of solvent is small, and/or, in a case where the reaction time is long.

An example of the high boiling point solvent is an aprotic polar organic solvent having a boiling point of 140° C. to 200° C. Specific examples of the high boiling point solvent include aprotic polar organic solvents such as dimethylsulfoxide, dimethylformamide, and N-methylpyrrolidone.

If an aprotic polar organic solvent serving as a high boiling point solvent is used in combination, from the viewpoint of improving the solubility and reactivity of 2-aminobenzamide, which is a labeling compound, and a reducing reagent, the amount thereof is preferably lower than that of the protic polar organic solvent in terms of vol %, and may be 4 vol % or more and less than 100 vol %, and may be 4 vol % to 70 vol %.

The "glycan labeling step" may be performed before Step (III): the above-described glycan elution step, or after Step (III). Therefore, the reaction between the glycan labeling reagent and the glycans in the glycan labeling solution may be performed in a state in which the glycans are adsorbed on the purifying agent, or in a state of being the eluate eluted from the purifying agent. Also, the glycans may be labeled in Step (III), that is, while the glycans are being eluted from the purifying agent on which the glycans are adsorbed. Furthermore, the glycan labeling solution may be used as the above-described "eluent for eluting the adsorbed glycans from the purifying agent".

The temperature of reaction between the glycan labeling reagent and the glycans in the glycan labeling solution may be 4° C. or more and 80° C. or less, for example, and may be 25° C. or more and 70° C. or less, for example. The reaction temperature is preferably the lower limit or higher because the reaction time is shortened, and the reaction temperature is preferably the upper limit or lower because partial decomposition of glycans due to high temperatures is suppressed. Also, the reaction time in the glycan labeling step may be 5 minutes or more and 600 minutes or less, for example, and may be 30 minutes or more and 300 minutes or less, for example. The reaction time is preferably the lower limit or higher in terms of quantitative labeling, and the reaction time is preferably the upper limit or lower because partial decomposition of glycans due to high temperatures is suppressed.

Note that portions of the free glycans acquired in Step (I): the glycan-containing sample acquisition step are of an aldehyde type, which form a glycan oxime. With a conventional technique, if an aldehyde group, which is a functional group of a free glycan, is reduced and the free glycan is converted to alditol, the glycan cannot be directly labeled. Also, if the aldehyde group, which is the functional group of a glycan, is converted to hydrazone by hydrazine, the glycan needs to be returned to the original free glycan through acetylation operation again in order to provide the label.

In contrast, according to Step (I): the glycan-containing sample acquisition step, it is possible to obtain glycans released as glycan oximes that can be directly labeled. That is, the glycans released from the glycoprotein contain glycan oximes, and the glycan oximes can be directly labeled. Therefore, the free glycans obtained in Step (I) can be obtained in a solution as a mixture of glycosylamine, glycan oxime, and a normal glycan having a hemiacetal hydroxy group at the reducing end, and these can be collectively labeled.

Step (V): Reduction Step

Step (V) is a reduction step of causing a reaction with a reduction solution containing a reducing reagent, and if the method for preparing a glycan from a glycoprotein in this embodiment includes Step (IV): the glycan labeling step, the method may also include Step (V): the reduction step as needed.

In modification through reductive amination, a Schiff base, which is formed through a reaction between the aldehyde group formed at the reducing end of the glycan and the amino group of the labeling compound, is reduced using a reducing reagent, and thereby a modification group is introduced at the reducing end of the glycan, which enables efficient labeling, for example.

The "reduction solution" contains at least a "reducing reagent", and may contain water, a buffer solution and/or an organic solvent, and the like.

The "reducing reagent" may contain at least one selected from the group consisting of sodium cyanoborohydride, sodium triacetoxyborohydride, methylamine borane, dimethylamine borane, trimethylamine borane, picoline borane, and pyridine borane, for example. Highly safe labeling is possible by using less toxic picoline borane.

From the viewpoint of both safety and reactivity, it is preferable to use picoline borane (2-picoline-borane). From the same viewpoint, if picoline borane is used as a reducing reagent, it is preferable to use 2-aminobenzamide as the glycan labeling reagent used in Step (IV): the glycan labeling step described above, for example.

The final concentration of the "reducing reagent" may be set to a concentration range of 1.0 mmol/L or more and 250 mmol/L or less, and may be preferably set to a concentration range of 1.2 mmol/L or more and 239 mmol/L or less. The efficiency of labeling glycan is improved by optimizing the concentration of the reducing reagent in this range.

If a buffer solution and/or an organic solvent is added to the reduction solution, it is possible to use the buffer solution and/or the organic solvent used in Step (IV) described above in the same manner. Note that, if picoline borane is used as a reducing reagent, it is preferable that a solvent contains a protic polar organic solvent. This makes it possible to dissolve picoline borane at a high concentration and thus to shorten the time required for the step. A mixed solvent of a protic polar organic solvent such as acetic acid and an aprotic polar organic solvent such as dimethylsulfoxide may be used as a solvent.

The "reduction step" may be performed in any stage as long as the product resulting from the reaction between the glycans and the glycan labeling reagent can be reduced. A glycan reducing reagent may be added to the glycan labeling solution, and the reduction step may be performed simultaneously with Step (IV): the glycan labeling step, for example.

Kit for Preparing Glycan from Glycoprotein

A kit for preparing a glycan from a glycoprotein according to this embodiment is a kit suitable for carrying out the method for preparing a glycan from a glycoprotein according to the embodiment described in the section "Method for preparing glycan from glycoprotein" above, the kit including:
  (a) a hydroxylamine compound;
  (b) a basic reagent; and
  (c) a purifying agent for purifying a glycan having a length of monosaccharide or more, the purifying agent being composed of a compound having a betaine structure. It is possible to provide reagents required for preparing a glycan from a glycoprotein, as a kit in this manner. Furthermore, this kit may contain (d) a glycan labeling reagent, and may contain (e) a reducing reagent. It is possible to prepare a glycan from a glycoprotein more easily by assembling reagents, information, and the like required for preparing the glycan from the glycoprotein into a kit.

The "kit" may include a protocol for using this kit as an instruction manual. The instruction manual may be written or printed on paper or other media, or may be recorded on an electronic medium such as a magnetic tape, a magnetic disk, or an optical disk.

Furthermore, the "kit" may include reagents and containers required for carrying out this kit. Examples thereof include a cleaning liquid for cleaning, and an eluent for eluting glycans from a purifying agent on which the glycan are adsorbed. The reagents included in this kit may be provided in the form of lyophilized powder, and in that case, the kit may further include a dilution liquid for dilution when the reagents are used. Also, the kit may include containers such as filter cups, multi-well plates, filter plates, and microtubes, and the containers may be filled with the reagents included in this kit. The definition of each term and preferred embodiments are as described in the section "Method for preparing glycan from glycoprotein" above.

Device for Preparing Glycan from Glycoprotein

A device for preparing a glycan from a glycoprotein according to this embodiment is a device suitable for carrying out the method for preparing a glycan from a glycoprotein according to the embodiment described in the section "Method for preparing glycan from glycoprotein" above, the device including:
  a first container holding portion configured to hold a first container in which a glycoprotein-containing sample that contains the glycoprotein is accommodated; a reagent introducing portion configured to introduce a reagent into the first container; and a second container holding portion configured to hold a second container that includes a purifying agent for preparing a glycan having a length of a monosaccharide or more, the purifying agent being composed of a compound having a betaine structure,
  in which the reagent introducing portion includes a glycan releasing reagent introducing portion configured to introduce a glycan releasing reagent that contains a hydroxylamine compound and a basic reagent into the first container. It is possible to prepare a glycan from a glycoprotein more easily by assembling reagents, members, and the like required for preparing the glycan from the glycoprotein into a device.

Note that the configuration of the device, which will be described later, is an example of the device for preparing a glycan from a glycoprotein according to this embodiment, and the scope of the present invention is not limited by this configuration. Also, the definition of each term and preferred embodiments are as described in the section "Method for preparing glycan from glycoprotein" described above.

The "first container holding portion" is for holding the first container in which a glycoprotein-containing sample is accommodated. There is no particular limitation on the mode in which the first container holding portion holds the first container, and examples thereof include a mode in which most of the first container is fitted and held in a holding opening or a holding hole in the first container holding portion, for example. In addition, examples thereof include a mode in which an engaging recess (engaging protrusion) in the first container is engaged with and held by an engaging protrusion (engaging recess) of the first container holding portion, and a mode in which the first container is sandwiched and held by a sandwiching portion of the first container holding portion.

The "second container holding portion" is for holding the second container that contains a purifying agent for purifying a glycan having a length of monosaccharide or more, the purifying agent being composed of a compound having a betaine structure. There is no particular limitation on the mode in which the second container holding portion holds the second container, and the second container holding portion can hold the second container in the same manner as the first container holding portion.

The "reagent introducing portion" is for introducing a reagent into the first container held by the first container holding portion. The reagent introducing portion includes at least a glycan releasing reagent introducing portion that introduces a glycan releasing reagent that contains a hydroxylamine compound and a basic reagent into the first container. The hydroxylamines and the basic reagent may be mixed together in the glycan releasing reagent introducing portion to prepare the glycan releasing reagent, or they may be mixed together in advance to prepare the glycan releasing reagent and then be introduced into the glycan releasing reagent introducing portion.

The "reagent introducing portion" may be able to introduce a reagent into the second container held by the second container holding portion, and include a glycan-containing sample introducing portion for introducing a glycan-containing sample obtained by releasing glycans from the glycoprotein from the first container, a cleaning liquid introducing portion for introducing a cleaning liquid for cleaning the purifying agent, and an eluent introducing portion for introducing an eluent for eluting the adsorbed glycan. Also, the reagent introducing portion may include the glycan labeling reagent introducing portion that introduces a glycan labeling reagent into the first container and/or the second container. These may be configured as separate and independent components from the glycan releasing reagent introducing portion, or may be configured as the same constituent member.

There is no particular limitation on the mode in which the reagent introducing portion introduces a reagent, and examples thereof include a mode in which liquid is sent from a liquid sending source in which the liquid to be sent is stored into the first container via a tubular member. In addition, examples thereof include a mode in which the liquid collected in the tubular member is injected into the first container.

Furthermore, a "solid-liquid separation portion" for subjecting the content of the second container to solid-liquid separation may be provided. The "solid-liquid separation portion" separates a solid and a liquid in the content contained in the second container. Here, the solid is substantially the purifying agent and the glycans adsorbed on the purifying agent.

If the solid-liquid separation portion is provided, a container provided with a filter that is capable of solid-liquid separation (e.g., a filter cup, a filter plate, or the like) may be used as the second container. Furthermore, a collection container (e.g., a collection tube, a collection plate, or the like) may be mounted on such a container, and then the collection container may be used. Also, in this case, the second container holding portion may be configured to include a collection container holding portion for holding the collection container mounted on the second container.

There is no particular limitation on the specific separation method of the solid-liquid separation portion, and any one of centrifugal filtration, filtration under vacuum pressure, and filtration under pressure may be used. The solid-liquid separation portion may be configured as a constituent member independent of the second container holding portion. In this case, a container transfer portion for automatically transferring the second container from the second container holding portion to the solid-liquid separation portion may be included. The container transfer portion may be configured to transfer only the second container in the transfer of the second container, or to transfer the second container in a state in which a collection container is mounted on the second container. The container transfer portion may be configured to include an arm that operates to hold and open the second container directly or indirectly (i.e., via the collection container) and move the second container, and an arm control portion that controls the operation of the arm.

Also, a temperature adjustment portion may be included, and if the temperature adjustment portion is included, the temperature adjustment portion need only have at least a heater function. The temperature adjustment portion heats the first container and/or the second container to at least a temperature required to release a glycan, make a glycan be adsorbed on a purifying agent, and/or elute the glycan from the purifying agent on which the glycan is adsorbed.

Also, at least any or preferably all of the operable components (e.g., the reagent introducing portion, the arm, the solid-liquid separation portion, and the temperature adjustment portion) may be automatically controlled. Accordingly, it is possible to prepare glycans from glycoproteins more quickly.

EXAMPLES

The following specifically describes the present invention using examples. However, the present invention is not limited to these examples.

Example 1 Synthesis of Purifying Agent

A carrier for concentrating a glycan in which a polymer whose side chain having a betaine structure is bonded to the main chain thereof is immobilized on an insoluble support was synthesized as the purifying agent. Although the synthesis of a polymer that contains a constitutional unit derived from 2-methacryloyloxyethyl phosphorylcholine (referred to as an "MPC polymer" hereinafter) on the surface of silica beads is described specifically, it is not intended to limit the scope of the present invention.

Synthesis of Purifying Agent

Introduction of Chain Transfer Group into Silica Beads 5 g of a silane coupling agent having a chain transfer group was added to a liquid mixture of 50 mL of an aqueous solution of acetic acid with a pH of 3.0 and 50 mL of ethanol, the resulting mixture was stirred at room temperature for 1 hour to hydrolyze the silane coupling agent, 5 g of silica beads, which are inorganic particles, were introduced as an example of an insoluble support, and the resulting mixture was stirred at 70° C. for 2 hours, the silica beads were collected from the reaction solution through suction filtration, and was heated at 100° C. for 1 hour. Then, the silica beads were dispersed in ethanol, the resulting mixture was shaken well, and the supernatant was removed through centrifugation and dried.

Synthesis of Polymer

2-Methacryloyloxyethylphosphorylcholine (manufactured by NOF CORPORATION, and referred to as "MPC monomer" hereinafter), which will be the constitutional unit of the polymer was dissolved in ethanol to produce 20 mL of 0.8 mol/L monomer solution. Then, AIBN was added to realize 0.027 mol/L and stirred until the resulting mixture became uniform. Then, 4 g of silica beads provided with the above-described chain transfer group was introduced therein, and was reacted at 70° C. for 6 hours in an argon gas atmosphere. Then, the silica beads were collected from the reaction solution through centrifugation, were dispersed in ethanol, were shaken well, were collected through suction filtration, and were dried to obtain a carrier in which the polymer containing a constitutional unit derived from 2-methacryloyloxyethylphosphorylcholine was immobilized on silica beads (simply referred to as "carrier" hereinafter).

Check Physical Properties of Purifying Agent
Measurement of Weight of Layer Containing Polymer that is Introduced on Surface of Carrier The weight of the layer containing the polymer that was introduced on the surface of the above-described carrier was obtained by measuring the rate of weight loss obtained by increasing the temperature from room temperature to 500° C. at increments of 10° C./min in an air atmosphere using a TGA device (TG/DTA6200 manufactured by Seiko Instruments Inc.) and maintaining 500° C. for 1 hour. When the weight of the layer containing the polymer that was introduced on the surface of particles was calculated based on this value and the surface area of the particles per unit weight separately obtained using the BET method, the weight was 1.08 mg/m$^2$.

Example 2 Relationship Between Reducing Reagent Concentration and Yield when Labeling Glycans Reaction Condition 1

(1) Preparation of Glycan Labeling Solution
(1-1) A mixed solvent of 10% acetic acid, 45% methanol, and 45% water was prepared.
(1-2) 1 M 2-aminobenzamide and picoline borane, which was a reducing reagent, were dissolved in the solution (1-1) so as to realize a concentration of 0.6, 1.2, 2.3, 4.7, 9, 47, and 239 mM.
(2) Release of O-Linked Glycan
Bovine fetuin protein (20 µg) was added to a liquid mixture of 50% hydroxylamine aqueous solution and DBU (5:2 (volume ratio), 15 µL) and was mixed, and the resulting mixture was heated using a heat block at 37° C. for 75 minutes.
(3) Collection of O-Linked Glycan
1000 µL of acetonitrile was added to 15 µL of the solution (2) prepared in (2) above and was mixed well, and the resulting mixture was added to 1 mg of the carrier synthesized as the purifying agent for purifying glycans in Example 1 above, and was mixed well. The mixture was added to a spin column (Ultrafree-MC, Millipore Cat#: UFC30VNB), and the carrier and the solution were separated from each other through centrifugation using a table-top centrifuge. Then, 400 µL of acetonitrile was added, and the solution was removed through centrifugation. 400 µL of acetonitrile was added again, and the solution was removed through centrifugation.
(4) Labeling of O-Linked Glycan
50 µL of the solution (1-2), which was a liquid mixture of picoline borane and 2-aminobenzamide that was prepared to have the concentrations described in (1-2), was added to the carrier, the solution was collected and was mixed with the above solution, and thereby the glycans were fluorescently labeled through a reaction at 50° C. for 2.5 hours
(5) Purification of O-Linked Glycan
The solution (4) containing the fluorescent labeled glycan obtained in (4) above was applied to a cleanup column (BS-45403 accessory available from Sumitomo Bakelite Co., Ltd.) to remove an excess reagent, and the fluorescently labeled glycans were analyzed through HPLC.

Reaction Condition 2

The reaction proceeded in the same manner, except that picoline borane was dissolved in the solution (1) so as to realize a concentration of 47, 93, 239, 374, 561, 748, and 935 mM in Reaction Condition 1 above.

Results

Figure 2:
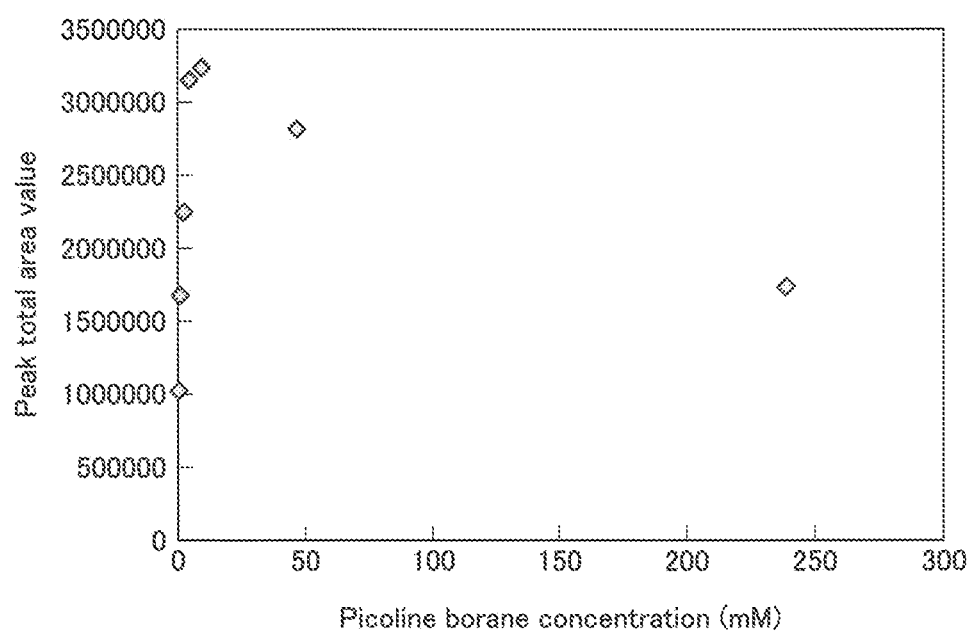
FIG. 2 is a graph showing the results of Example 2 obtained when examining the relationship between the concentration of a reducing reagent at the time of glycan labeling and the yield (on the low concentration side).
Figure 3:
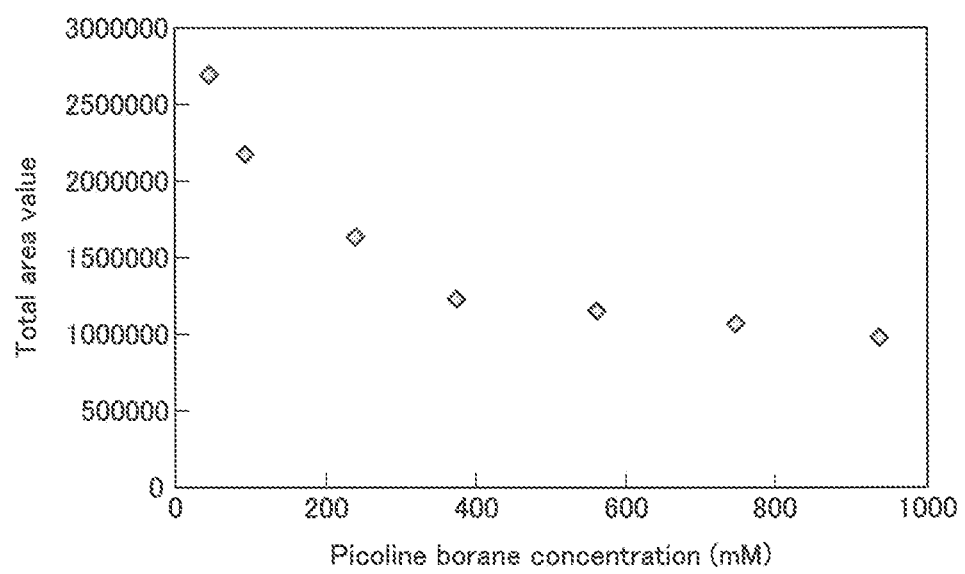
FIG. 3 is a graph showing the results of Example 2 obtained when examining the relationship between the concentration of a reducing reagent at the time of glycan labeling and the yield (on the high concentration side).

The graph in FIG. 2 shows the results of Reaction Condition 1, and the graph in FIG. 3 shows the results of Reaction Condition 2. The horizontal axis indicates the picoline borane concentration [mM] and the vertical axis indicates the peak total surface area, that is, the labeling efficiency with 2-aminobenzamide.

From the results shown in FIGS. 2 and 3, it was confirmed that the labeling efficiency was the highest when the concentration range of picoline borane was 5 mM or more and 20 mM or less, and the yield further decreased at a concentration of higher than 239 mM. The reducing reagent is usually used at a concentration of 200 mM or more, for example, and sodium cyanoborohydride, which is a reducing reagent that is widely used in this technical field, is usually used at a concentration of 1 M (1000 mM), for example. Therefore, it can be understood that the results obtained in this example are very low concentrations, compared to the concentrations of reducing reagent used in the technical field.

Example 3 Preparation of Glycan/Purifying Agent (1) Release of O-Linked Glycan
Bovine fetuin protein (20 µg) was added to a liquid mixture of 50% hydroxylamine aqueous solution and DBU (5:2 (volume ratio), 15 µL) and was mixed, and the resulting mixture was heated using a heat block at 37° C. for 75 minutes.
(2) Collection of O-Linked Glycan
1000 µL of acetonitrile was added to 15 µL of the solution (1) prepared in (1) above and was mixed well, and the resulting mixture was added to 1 mg of the carrier synthesized as the carrier for purifying glycans in Example 1 above, and was mixed well. The mixture was added to a spin column (Ultrafree-MC, Millipore Cat#: UFC30HVNB), and the carrier and the solution were separated from each other through centrifugation using a table-top centrifuge. Then, 400 µL of acetonitrile was added, and the solution was removed through centrifugation. 400 µL of acetonitrile was added again, and the solution was removed through centrifugation.
(3) Labeling of O-Linked Glycan
50 µL of the liquid mixture of picoline borane and 2-aminobenzamide was added to the carrier on which the treatment in (2) above was performed, the solution was collected and was mixed with the above solution, and thereby the glycans were fluorescently labeled through a reaction at 50° C. for 2.5 hours.
(4) Purification of O-Linked Glycan
The solution (3) containing the fluorescent labeled glycan obtained in (3) above was applied to a cleanup column (BS-45403 accessory available from Sumitomo Bakelite Co., Ltd.) to remove an excess reagent, and the fluorescently labeled glycans were analyzed through HPLC.

Comparative Example 4 Preparation of Glycan/Cleanup Column (1) Release of O-Linked Glycan
O-linked glycans were released in the same manner as (1) of Example 3.
(2) Collection of O-Linked Glycan
1000 µL of acetonitrile was added to 15 µL of the solution prepared in (1) above and was mixed well, and the resulting mixture was added to a cleanup column (BS-45403 accessory available from Sumitomo Bakelite Co., Ltd.), which is the carrier for purifying glycans used in this comparative example, and the solution was removed through centrifugation using a table-top centrifuge. Then, 400 µL of acetonitrile was added, and the solution was removed through centrifugation. 400 µL of acetonitrile was added again, and the solution was removed through centrifugation.

(3) Labeling of O-Linked Glycan

50 µL of the liquid mixture of picoline borane and 2-aminobenzamide was added to the cleanup column, the solution was collected and was mixed with the above solution, and thereby the glycans were fluorescently labeled through a reaction at 50° C. for 2.5 hours.

(4) Purification of O-Linked Glycan

O-linked glycans were purified in the same manner as (4) of Example 3.

Comparative Example 5 Preparation of Glycan/Graphite Carbon Column (1) Release of O-Linked Glycan O-linked glycans were released in the same manner as (1) of Example 3.

(2) Collection of O-Linked Glycan 1 mL of acetonitrile was passed through a graphite carbon column (Supelclean ENVI-Carb C available from Sigma-Aldrich Co., LLC). 3 mL of water was then passed therethrough. Then, 15 µL of the solution prepared in (1) above and 180 µL of 0.1% acetic acid water were mixed together and was passed through a graphite carbon column, which is the carrier for purifying glycans used in this comparative example. 3 mL of water was passed therethrough to wash graphite carbon. A 0.22 µm-filter was mounted, 500 µL of 50% acetonitrile aqueous solution containing ammonium acetate was passed therethrough, and the solution was collected. The collected solution was dried using a centrifugal evaporator.

(3) Labeling of O-Linked Glycan

50 µL of the liquid mixture of picoline borane and 2-aminobenzamide was added to the sample dried in (2) above, and the glycans were fluorescently labeled through a reaction at 50° C. for 2.5 hours.

(4) Purification of O-Linked Glycan

O-linked glycans were purified in the same manner as (4) of Example 3.

Figure 4:
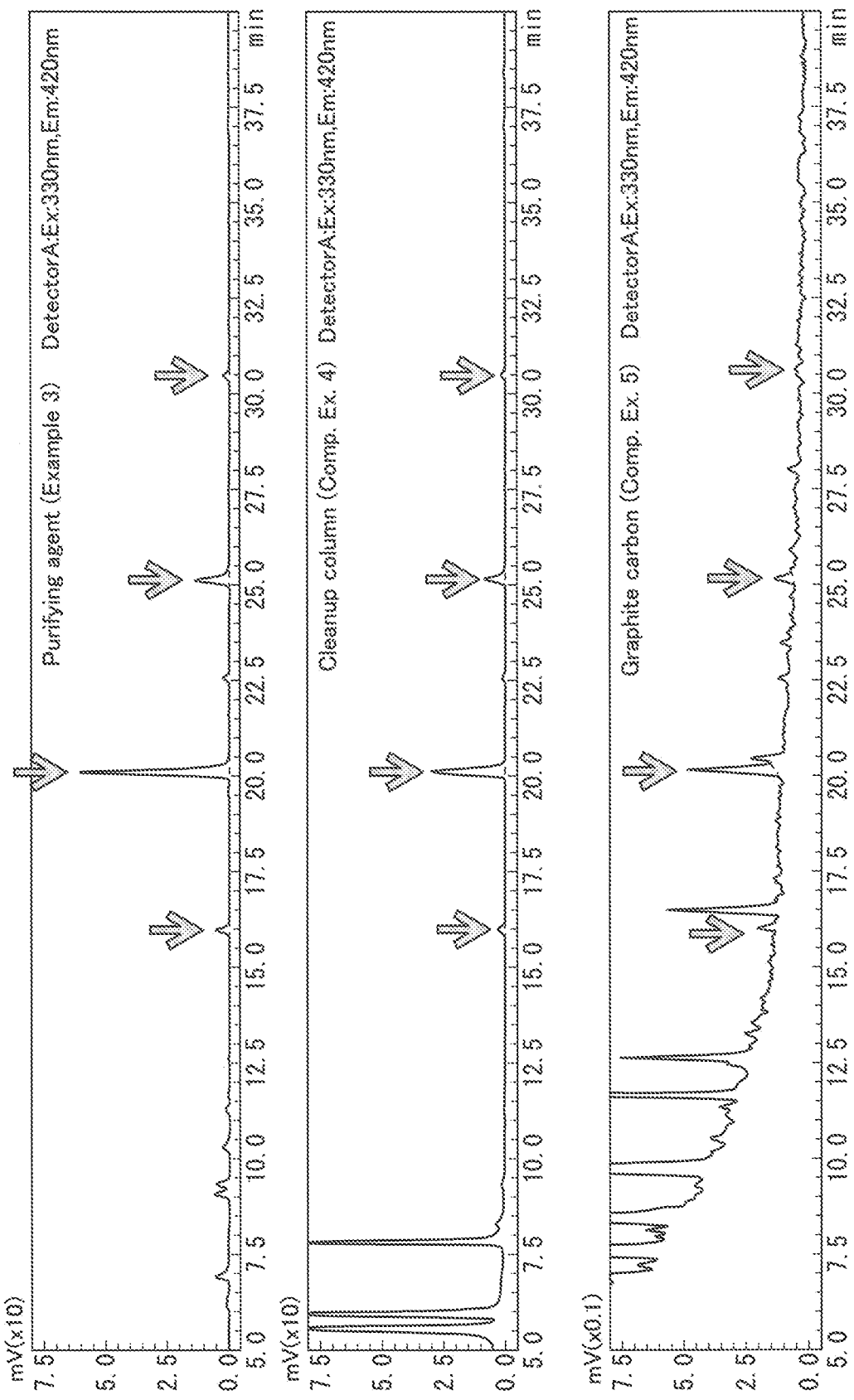
FIG. 4 is a chart of HPLC analysis showing the results of Example 3 obtained when examining the preparation of glycans, through a comparison between Comparative Example 4 and Comparative Example 5.

The graphs in FIGS. 4 and 5 show the results of Example 3 and Comparative Examples 4 and 5. FIG. 4 shows a chart of the results of HPLC analysis. FIG. 5 shows the summary of the results of HPLC analysis in bar graphs, the horizontal axis showing the types of carriers used for purification, and the vertical axis showing the peak total surface area, that is, labeling efficiency with 2-aminobenzamide. As a result, when the purifying agent of the present invention synthesized in Example 2 is used, O-linked glycans were efficiently prepared (Example 3). On the other hand, when a cleanup column was used, the yield was about the half the yield obtained when the purifying agent of the present invention was used (Comparative Example 4), and when graphite carbon was used, most of the glycans was not collected (Comparative Example 5).

INDUSTRIAL APPLICABILITY

The present invention provides a method, a kit, and a device for preparing a glycan from a glycoprotein. Therefore, the present invention can be used in the technical fields in which preparation of glycans from glycoproteins, in particular, preparation of glycans that include O-linked glycans with a small molecular weight, is required, for example, such as life science, medical care, and drug discovery, to elucidate a mechanism of the development of various diseases associated with structural changes in glycans, and to develop disease treatments, diagnostic techniques, and the like.

The invention claimed is:

1. A method for preparing an O-linked glycan from a glycoprotein, comprising:
   (I) a step of obtaining an O-linked glycan-containing sample by bringing an O-linked glycan releasing solution that contains a hydroxylamine compound and a basic reagent into contact with the glycoprotein and releasing O-linked glycan from the glycoprotein;
   (II) a step of adsorbing an O-linked glycan having a length of a monosaccharide or more on a purifying agent for purifying the O-linked glycan by bringing the O-linked glycan-containing sample into contact with the purifying agent, comprising a compound having a betaine structure; and
   (III) a step of eluting the O-linked glycan from the purifying agent.

2. The method according to claim 1, further comprising
   (IV) a glycan labeling step of reacting a glycan labeling reagent in a glycan labeling solution and the glycan with each other.

3. The method according to claim 2, further comprising
   (V) a reduction step of reducing the O-linked glycan with a reduction solution that contains a reducing reagent.

4. The method according to claim 3,
   wherein a concentration of the reducing reagent in the reduction solution is 1.0 mmol/L or more and 250 mmol/L or less.

5. The method according to claim 1,
   wherein the O-linked glycan releasing solution contains hydroxylamines in an amount of 2% or more and 70% or less.

6. The method according to claim 1,
   wherein the hydroxylamine compound is at least one selected from the group consisting of hydroxylamine, salts of hydroxylamine, O-substituted hydroxylamine, and salts of O-substituted hydroxylamine.

7. The method according to claim 1,
   wherein the basic reagent is at least one selected from the group consisting of alkali metal hydroxides, weak acid salts of alkali metals, alkaline earth metal hydroxides, alkaline earth metal salts dissolved in aqueous ammonia, and organic bases.

8. The method according to claim 7,
   wherein the alkali metal hydroxide is lithium hydroxide, sodium hydroxide, or potassium hydroxide, the weak acid salt of alkali metals is sodium bicarbonate or sodium carbonate, the alkaline earth metal hydroxide is calcium hydroxide, barium hydroxide, or strontium hydroxide, the alkaline earth metal salt is calcium acetate, calcium chloride, barium acetate, or magnesium acetate, and the organic base is 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene, 1,1,3,3-tetramethylguanidine, 2-tert-butyl-1,1,3,3-tetrametylguanidine, or cetyltrimethylammonium hydroxide.

9. The method according to claim 1,
wherein the purifying agent contains the compound having the betaine structure as an active ingredient.

10. The method according to claim 9,
wherein the purifying agent is a carrier for concentrating a glycan in which a polymer whose side chain that has the betaine structure is bonded to a main chain thereof is immobilized on an insoluble support.

* * * * *